United States Patent [19]

Miller et al.

[11] 4,048,651

[45] Sept. 13, 1977

[54] COLOR-CORRECTED VIDEO SIGNAL PROCESSING WITH AUGMENTED COLOR LOCK

[75] Inventors: James A. Miller, Chatsworth; Morris L. Firkins, Lake Hughes, both of Calif.

[73] Assignee: Bell & Howell Company, Chicago, Ill.

[21] Appl. No.: 594,886

[22] Filed: July 10, 1975

[51] Int. Cl.² .............................................. H04N 5/76
[52] U.S. Cl. .......................................... 358/8; 360/36; 360/73
[58] Field of Search .................. 358/8; 360/36, 27, 73

[56] References Cited

U.S. PATENT DOCUMENTS

| | | | |
|---|---|---|---|
| 3,017,462 | 1/1962 | Clark et al. | 360/36 X |
| 3,175,035 | 3/1965 | MacDonald | 360/27 |
| 3,400,227 | 9/1968 | Lear et al. | 360/93 |
| 3,594,498 | 7/1971 | Smith | 358/8 |
| 3,769,449 | 10/1973 | Inoue | 358/8 |
| 3,871,020 | 3/1975 | Wilber | 358/8 |
| 3,873,990 | 3/1975 | Wilber | 358/8 |
| 3,893,169 | 7/1975 | Hall, Jr. | 360/73 |
| 3,900,885 | 8/1975 | Tallent et al. | 358/8 |
| 3,959,819 | 5/1976 | Kubo | 360/73 |
| 4,001,876 | 1/1977 | Schiess et al. | 358/8 |

FOREIGN PATENT DOCUMENTS 988,391  4/1965  United Kingdom ..................... 358/8

Primary Examiner—Richard Murray
Assistant Examiner—Aristotelis M. Psitos
Attorney, Agent, or Firm—Benoit Law Corporation

[57] ABSTRACT

There is disclosed the combination of an information medium having physical characteristics representative of synchronized color video information, an electric power supply providing alternating current power subject to frequency fluctuations, transport equipment coupled to the power supply for transporting the information medium at a variable relative speed dependent upon the frequency fluctuations of the alternating-current power, a transducer device disposed in proximity to the information medium and responsive to the physical characteristics of the information medium to provide an electrical signal including a synchronization component and including a chrominance component having a time-base error dependent upon the variable speed of the transport means, and means responsive to the synchronization component of the electrical signal for compensating the time-base error of the chrominance component of the electrical signal. The synchronization component includes a horizontal synchronization signal affected by the above mentioned time-base error, and the time-base error of the chrominance component is compensated in response to the time-base error in the horizontal synchronization signal.

5 Claims, 6 Drawing Figures

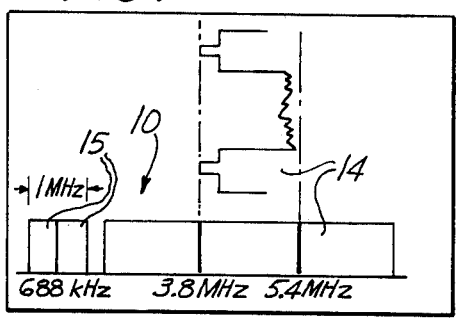
FIG. 1
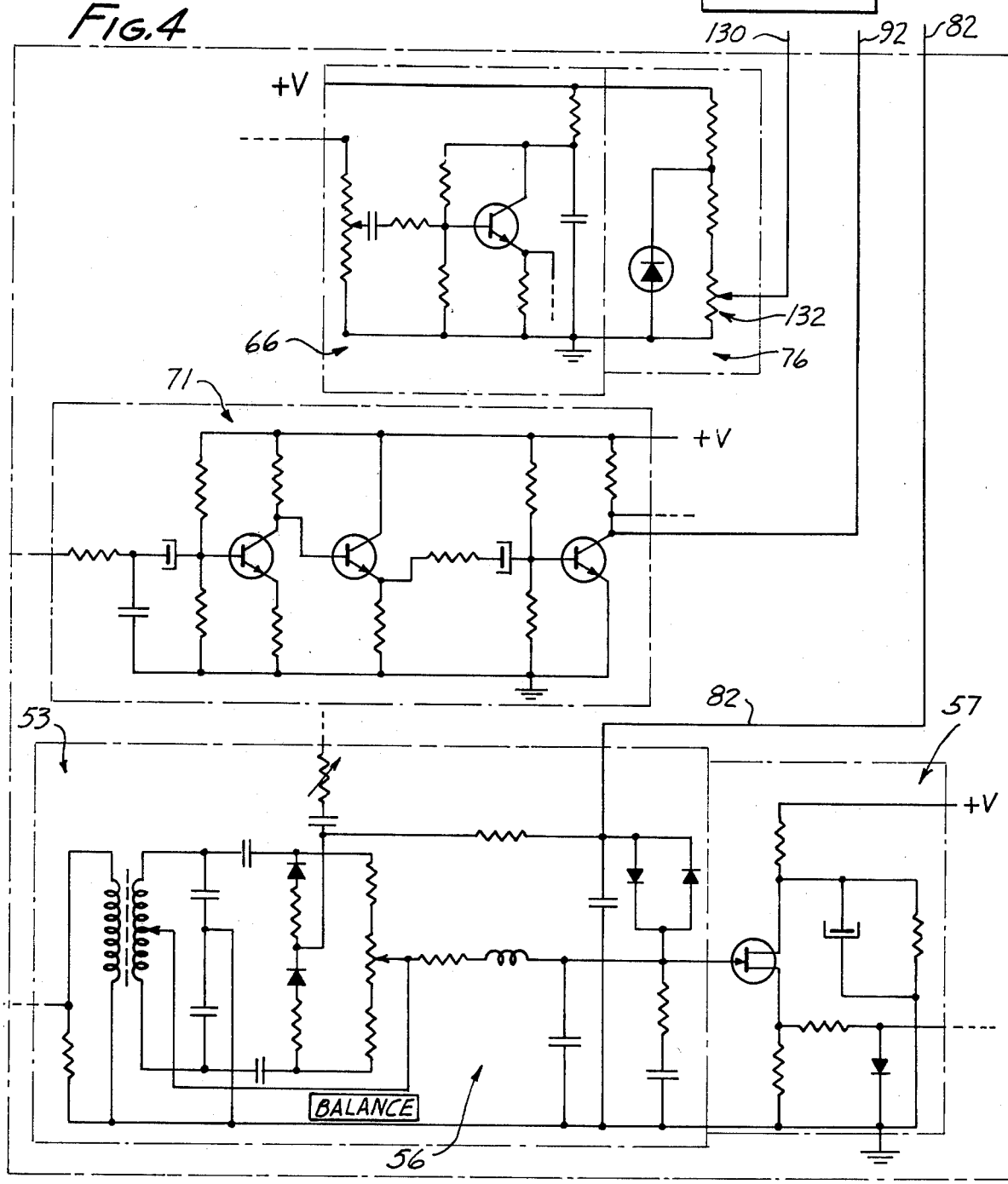
FIG. 5
FIG. 4

COLOR-CORRECTED VIDEO SIGNAL PROCESSING WITH AUGMENTED COLOR LOCK

BACKGROUND OF THE INVENTION

1. Field of the Invention

The subject invention relates to the processing of composite video signals, including chrominance signals, to the correction of time base errors in such signals, and to the playback of recorded video signals.

2. Description of the Prior Art

Despite the remarkable progress made in recent years in the field of color video signal recording and playback, there persists a need for improved equipment which will prevent color degradation or loss that occurs with existing apparatus in response to frequency variations in available alternating-current power supplies.

More specifically, a well-known type of video tape recorder records the video information in the form of separate luminance and chrominance signals. For the purpose of recording, the chrominance signals are relocated on a carrier frequency which is lower than the standard chrominance subcarrier frequency. Upon playback, the sidebands of that lower recording carrier are beat against a signal that is affected by the same time base errors as the played back chrominance signal, but that has a frequency equal to the sum of the standard chrominance subcarrier frequency and the special recording carrier frequency. In this manner, it is possible to obtain a difference signal which contains the chrominance information in sidebands of a carrier having the standard subcarrier frequency and which is essentially free from time base errors.

Prior art in this area uses an adjustable color lock control signal to enable the continued elimination of time base errors in the above mentioned manner. In general, the system just described is workable where the phase difference between the signals that are beat as mentioned above to relocate the chrominance sidebands about a standard subcarrier frequency, remain within about one percent tolerance. Beyond that, color loss occurs with the prior-art approach just described.

In an attempt to cope with this kind of problem in practical applications, some prior-art equipment has an externally accessible, manually adjustable color lock control potentiometer which, upon manual adjustment, will permit the voltage controlled oscillator to follow occurring time base errors.

Unfortunately, manual color restoration is impossible or at least impractical in many situations. For instance, if the video playback equipment is to be employed in the context of an airborne video passenger entertainment system, existing safety regulations generally require a packaging of the equipment which inhibits provision and practical use of manually adjustable color lock controls.

Moreover, the frequency of the power generated aboard aircraft and other vehicles is seldom as accurate as the frequency of the power available from public utility systems and similar entities. For instance, frequency variations within a two percent positive and negative swing relative to a nominal frequency are not rare aboard aircraft and in other situations where power is generated locally. This, of course, means among other things that the speed of a video head scan drum will vary over a four percent span with a corresponding introduction of time base errors into the reproduced video signal, resulting in frequent loss of color.

The more sophisticated prior-art proposals for preserving color in reproduced video signals typically run into problems of complexity and bulkiness which render them unsuitable for use aboard aircraft or in relatively low-cost and light-weight equipment.

The control of chrominance signal processing in response to fluctuations in a video synchronization signal, such as the horizontal sync signal, is not new as such. For instance, a well-known video tape recorder and playback machine employs the horizontal sync signal to distinguish between the regular playback mode in which recorded color video information is reproduced for motion picture type display and the still mode in which selected portions of the recorded color video information are repeatedly reproduced for still picture display.

However, there is a lack of suitable equipment providing compensation of time-base errors of the chrominance component of a composite color video signal induced by larger frequency variations in a local power supply.

SUMMARY OF THE INVENTION

It is general object of this invention to overcome the above mentioned disadvantages.

It is a related object of this invention to provide improved apparatus for processing a composite video signal with an improved compensation of time base errors in the chrominance signal.

It is a germane object of this invention to provide improved apparatus for inhibiting color loss in the reproduction of recorded color video signals in response to frequency fluctuations of a local power supply.

Other objects of this invention will become apparent in the further course of this disclosure.

The subject invention resides in a combination comprising an information medium having physical characteristics representative of synchronized color video information, an electric power supply providing alternating-current power subject to frequency fluctuations, transport means coupled to the power supply for transporting the information medium at a variable relative speed dependent upon the frequency fluctuations of the alternating-current power, transducer means disposed in proximity to the information medium and responsive to the physical characteristics of the information medium to provide an electrical signal including a synchronization component and including a chrominance component having color sidebands on a first carrier frequency and a time-base error dependent upon the variable speed of the transport means, the above mentioned synchronization component including a horizontal synchronization signal affected by the time-base error, means connected to the transducer means for amplifying the electric signal including the synchronization component and the chrominance component having the color sidebands, and means for compensating the time-base error of the chrominance component of the electrical signal.

The latter compensating means include color lock means for providing a direct current signal, automatic phase control means connected to the color lock means and to the amplifying means to provide with the aid of the above mentioned direct current signal and the amplified electric signal an output signal having a frequency different from the first carrier frequency and being affected by the time-base error, and means connected to the amplifying means and to the automatic phase control means for relocating the amplified color sidebands about a stable second carrier frequency with the aid of the output signal of the automatic phase control means. The subject combination further includes means for augmenting the tolerance of the color lock means to effects of the frequency fluctuations including means for sensing a pulse rate change in the horizontal synchronization signals, means connected to the sensing means for providing a rate change signal corrsponding to the sensed rate change, and means for augmenting the above mentioned direct current signal with the rate change signal.

In accordance with a preferred embodiment of the subject invention, the power supply is mounted for portable movement by a vehicle. By way of example, this vehicle may be an aircraft or a train.

Also in accordance with a preferred embodiment of the subject invention, the information is a magnetic tape, and the transport means and the transducer means are included in color video tape playback equipment.

BRIEF DESCRIPTION OF THE DRAWINGS

The subject invention and its aspects will become more readily apparent from the following description of preferred embodiments thereof, illustrated by way of example in the accompanying drawings, in which like reference numerals designate like or functionally equivalent parts, and in which:

FIG. 1 is a diagram showing a frequency range of a recorded composite video signal that may be played back by the equipment of the subject invention;

FIGS. 3 and 4 constitute a circuit diagram of color video signal processing and time base error compensating apparatus which, in accordance with a preferred embodiment of the subject invention, are included in the combination shown in FIG. 6;

FIG. 5 shows how the sheets of FIGS. 3 and 4 should be juxtaposed; and

DESCRIPTION OF PREFERRED EMBODIMENTS

Figure 2:
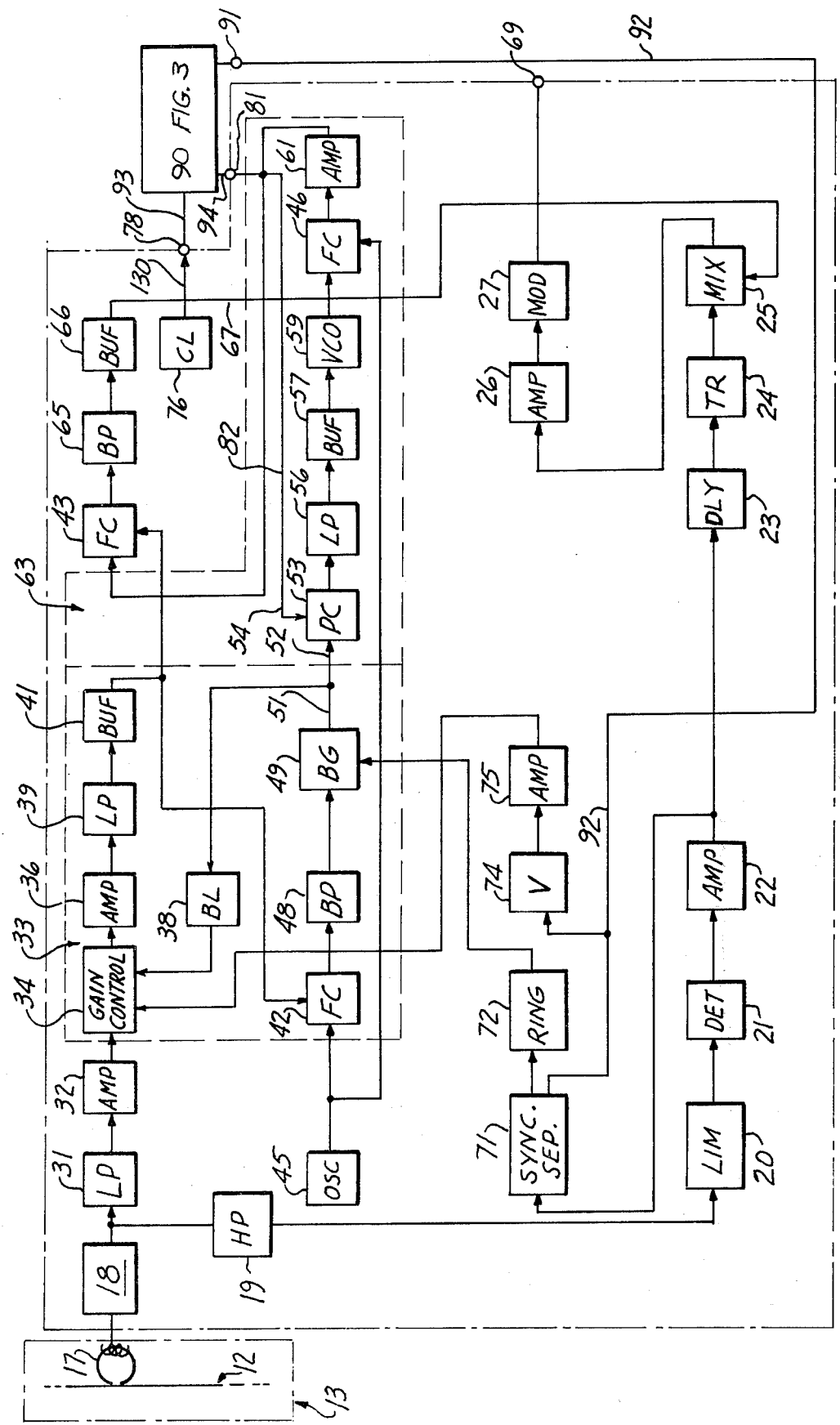
FIG. 2 is a block diagram of color signal processing equipment with which the subject invention may be practiced.
Figure 6:
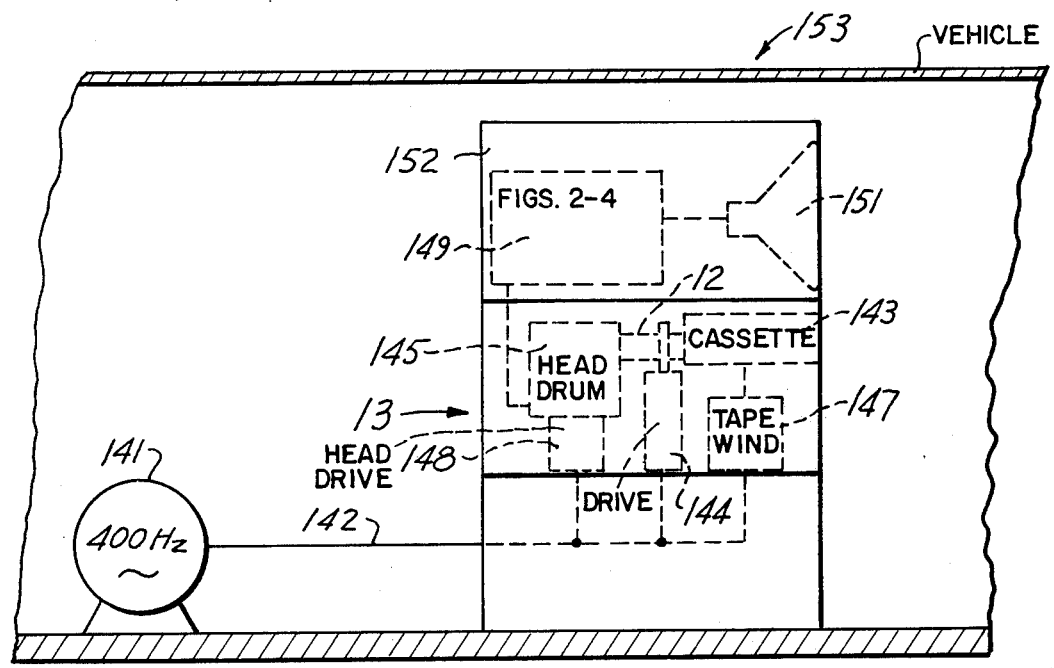
FIG. 6 is a longitudinal section through a vehicle with a showing of other parts of the combination in accordance with a preferred embodiment of the subject invention including a local electric power supply and video signal playback and display equipment.

By way of introduction to the disclosure of a preferred embodiment of the subject invention in FIG. 6, FIGS. 1 and 2 show, respectively, a diagram illustrating a recorded composite video signal that may be employed in the practice of the subject invention and a color video signal processing apparatus on which the subject invention may be practiced.

According to FIG. 1, a composite color video signal 10, recorded on a recording tape 12 in a color video recording and playback apparatus 13 (FIG. 2) has separate luminance and chrominance signals. The luminance signal 14 is frequency modulated using 3.8 MHz for the sync tip and 5.4 MHz for peak white frequency. The chrominance signal 15 is contained in color sideband signals that have been relocated on a typically suppressed carrier frequency of 688 kHz. The recording process as such does not form part of the subject invention, which is primarily concerned with playback. However, the kind of recording represented in FIG. 1 and the kind of recorder symbolized by the box 13 are well-known and reference may, for instance, be had to the Sony Service Manual for the VO-1600 Video-cassette Recorder (2nd Edition, 1972), by Sony Corporation. That Service Manual also shows and describes most of the equipment shown in FIG. 2.

Figure 3:
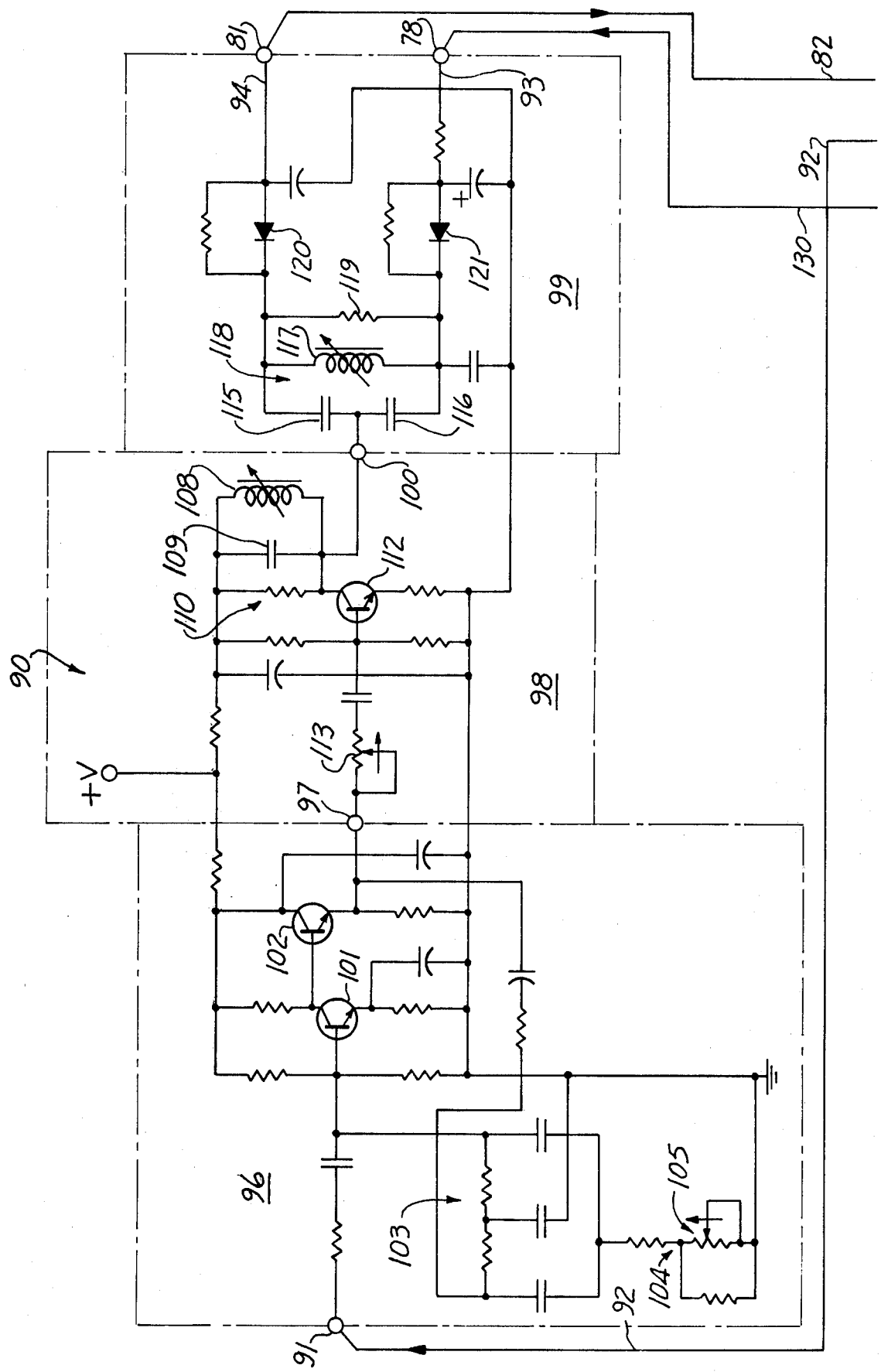

The equipment of FIGS. 2 to 4 addresses itself to the task of reproducing and restoring the recorded composite color video signal 10 from the magnetic tape 12. In this respect, it should be understood that the utility of the subject invention is not limited to magnetic tape recording and playback, but extends to video recording disks and other color video recording fields. In fact, the utility of the subject invention extends to color video signal transmission and closed circuit areas wherein a color video signal is processed to eliminate time base errors.

The recorded color video signal 10 shown in FIG. 1 is played back from the tape 12 by one or more magnetic playback or magnetic recording and playback heads 17. Pursuant to conventional practice, playback amplifier and similar equipment 18 is connected to the head 17 for that purpose. The equipment 18 may, for instance, include one or more preamplifiers, buffers, equalizer amplifiers and switching devices for permitting video signal playback by any desired and practical number of heads.

The playback equipment 18 issues the luminance signal 14 via a high pass filter 19 to a limiter 20 and thence to a frequency modulation detector 21. A video amplifier 22 boosts the detector output to the requisite level and may include conventional equipment (not particularly shown) for providing de-emphasis and buffer action, as required and customary in video signal processing equipment.

The amplified detected luminance signal is applied to a delay line 23 which generally makes up for the delay imposed on the chrominance signal by the chrominance signal processing steps described more fully below. The delayed luminance signal is sent through a trap 24 to a mixer 25. The trap 24 removes any residual 3.58 MHz color signal in the luminance signal. The mixer 25 combines the processed luminance signal and the processed chrominance signal more fully described below into a composite color video signal, which is amplified at 26 and modulated onto a VHF carrier at 27 for a direct application of the reproduced and processed color video signal to the antenna terminals of a color television or video display set for a display of the recorded and reproduced color video program.

The playback equipment 18 applies the reproduced chrominance signal or sidebands 15 via a low pass filter 31 and amplifier 32 to an automatic color gain control (AGC) 33 for maintaining a constant chrominance level despite differences in video head output.

A gain control element 34 may, for instance, include a field effect transistor (not shown), the source-to drain impedance of which forms a voltage divider with a series resistor (not shown) between the amplifier 32 and a further amplifier 36. The impedance of the field effect transistor in the gain control 34 is, in turn, controlled by a burst level detector 38, providing an output voltage proportional to burst amplitude.

The amplifier 36 follows the gain control element 34 to restore signal amplitude to the value required in the frequency converter described below. A low pass filter 39 eliminates crosstalk components above the chrominance range. A buffer 41 for the low pass filter 39 provides a low-impedance signal source for two frequency converters 42 and 43.

A local oscillator 45 applies a crystal controlled signal to the frequency converter 42 and to a frequency converter 46. That signal typically has a frequency equal to the standard color subcarrier frequency of 3.58 MHz, for instance.

The frequency converter 42 acts as a mixer which beats the chrominance sidebands 15 of the lower recording carrier of 688 kHz with the crystal-controlled 3.58 MHz oscillation. A band pass filter 48 separates from the modulation product of the converter the sum signal of 4.27 MHz.

The latter separated sum frequency signal drives a burst gate amplifier 49 which, in turn, drives the burst level detector 38. The output of the burst gate amplifier 49 at 51 is proportional in amplitude to playback chrominance and is affected by the frequency phase or time base errors of the playback signal. The output of the burst gate amplifier 49 is applied to one input 52 of a phase comparator 53. The component 53 compares the output of the burst gate amplifier 49 to a locally generated 4.27 MHz signal applied to the second input 54 of the phase comparator 53. The result is a DC correction voltage or error signal, the magnitude of which is proportional to the phase error between the input signals received at 52 and 54.

After filtering by a low pass filter 56 and buffering at 57, the error signal produced by the phase comparator or detector 53 adjusts the output frequency of a voltage controlled oscillator operating at a nominal frequency of 688 kHz wich corresponds to the above mentioned recording color subcarrier of the chrominance sidebands 15 (see FIG. 1).

The frequency converter 46 mixes the latter output signal of the voltage controlled oscillator 59 and the signal produced by the local oscillator 45.

The sum frequency of 4.27 MHz produced by the frequency converter 46 is filtered and amplified at 61, to be applied to an input of the frequency converter 43 and to the above mentioned second input 54 of the phase comparator 53. The color processor equipment of FIG. 2 thus includes an automatic phase control 63.

Receiving the 688 kHz signal from the buffer 41 of the automatic gain control 33 and the 4.27 MHz signal from the automatic phase control 63, the frequency converter 43 relocates the chrominance sidebands 15 about the standard color subcarrier frequency of 3.58 MHz. These relocated chrominance sidebands are extracted by a band pass filter 65 and applied to a buffer 66, providing a drive for the luminance chrominance mixer 25 via a line 67. The resulting VHF modulated composite color video signal as described above appears at an output 69 of the color processor.

Reverting to the detected luminance signal, a sync separator 71 is connected to the amplifier 22 to separate synchronization information from the played back video signal. In this manner, composite sync is applied to a ringing circuit 72 which, including a low-Q series resonant circuit, will ring for about one and one half cycles during horizontal sync pulses whereby the peak of the first half cycle coincides with burst timing. The signal so developed is applied to the burst gate amplifier 49 as a gating pulse for the color burst.

The composite horizontal and vertical sync signal separated at 71 is applied to a vertical sync separator 74.

A pulse amplifier 75 applies the resulting vertical synchronization signal to the above mentioned gain control element 34 to disable the automatic gain control system 33 during the vertical blanking interval, so no color bursts occur during that period.

In accordance with prior-art practice, a potentiometer or similar device (not shown) may be employed in a color lock pre-set device 76 to adjust the level of a DC signal at 78 to a desired mean value.

In practice, the DC signal from the terminal 78 would be applied via an input terminal 81 and lead 82 to the second input 54 of the phase comparator 53 in order to adjust the output frequency of the voltage controlled oscillator 59 to provide for a correction of time base errors. As mentioned above, that correction is not adequate when the phase difference between the signals that are beat to relocate the chrominance sidebands about a standard subcarrier frequency, exceed a tolerance of about one percent. In that case, color loss is likely to occur in the reproduced and displayed video signal.

The subject apparatus remedies that deficiency by means of equipment 90 which senses a pulse rate change in the horizontal sync signal, provides a rate change signal corresponding to the sensed rate change, and compensates the above mentioned time base errors with that rate change signal. According to the illustrated preferred embodiment, the equipment 90 has an input 91 for receiving via a line 92 at least horizontal sync signals from the sync separator 71. The equipment 90 also has an input 93 connected to the terminal 78 of the color lock pre-set 76 for receiving the above mentioned DC signals.

The equipment 90 further has an output 94 which is connected to the terminal 81, lead 82 and second input 54 of the phase comparator 53 to provide and apply the mentioned rate change signals corresponding to the sensed pulse rate change of the horizontal sync signals for compensating the time base errors in the chrominance signal by varying the output frequency of the voltage controlled oscillator 59.

A preferred embodiment of the subject apparatus will now be shown with the aid of FIGS. 3 and 4.

According to FIG. 3, the equipment 90 includes a 15 kHz oscillator 96 for generating at a terminal 97 a frequency varying in proportion to the pulse rate change of the horizontal sync signal, a tuned circuit 98 coupled to the oscillator 96 via the terminal 97 and tuned to a nominal frequency of the horizontal sync signal and a frequency descriminator 99 coupled to the tuned circuit via a terminal 100.

The oscillator 96 receives during playback operation, through its input terminal 91, horizontal sync signals provided by the sync separator 71 from the played back video signal. The oscillator 96 is designed for 15 kHz operation, having a pair of transistors 101 and 102 and twin tee filters 103 and 104. The nominal frequency of the free running twin tee type oscillator 96 is adjustable by operation of a variable resistor 105.

The oscillator frequency at the terminal 97 varies in proportion to the rate change of the input horizontal sync signal by synchronizing thereon. The rate change of the horizontal sync signal, in turn, is indicative of time base errors in the played back video signal, such as errors introduced by varying head-to-tape velocities.

Within the broad principle of the subject invention, the pulse rate change of the horizontal sync signal may alternatively be sensed by determining the rate of occurrence of the color burst signal.

The tuned circuit 98 has an inductor 108, capacitor 109, and resistor 110 connected in parallel and driven by a transistor 112. Inductor 108 in adjustable to provide peaking of the tuned circuit. The resistor 110 flattens the Q factor of the tuned circuit so that there occurs at the terminal 100 a signal varying in amplitude in accordance with the frequency provided by the oscillator 96 and thus in accordance with pulse rate changes of the horizontal sync signal. The amplitude of the signal appearing at the terminal 100 is adjustable by a variable resistor 113.

The terminal 100 is connected to the junction between two series connected capacitors 115 and 116 which, in turn, are connected in parallel to an ajustable inductor 117. The tuned circuit 118 provided by the components 115 to 117 operates at the frequency of the horizontal sync signal of 15,750 Hz. The phase of the voltage on one side of the inductor 117 is 180° out of phase with the voltage at the other end of the inductor. These two voltages appear across a resistor 119 where they cancel out when the horizontal sync signal frequency is 15,750 Hz.

If the oscillator 96 is shifted in frequency due to a change of the horizontal sync pulse rate, the signal provided by the tuned circuit 98 correspondingly shifts in frequency. Depending on the direction of the frequency shift, the phase of the voltage at one end of the inductor 117 will lead or lag the phase of the voltage at the other end and will prodce a resultant AC voltage across the resistor 119. That resultant voltage is rectified by diodes 120 and 121 and a positive or negative DC voltage will appear at the output 94 of the equipment 90. If the horizontal sync pulse rate increases, the DC voltage at the output 94 will decrease. On the other hand, if the horizontal sync pulse rate decreases, the DC voltage at the output 94 will increase.

The color lock pre-set 76 applies via a lead 130, terminal 78 and input 93 a positive-going DC voltage for biasing the phase discriminator 99 and the buffer 57.

In this respect, it may be recalled that the DC voltage as such is insufficient to control the reconstitution of the chrominance signal and the compensation of time base errors within sufficiently broad tolerances. Rate changes in the horizontal sync signal are thus employed to augment the DC signal that influences the reconstitution of the chrominance sidebands so as to compensate time base errors.

Circuit diagrams of video signal processing components with which the equipment 90 cooperates are shown in FIG. 4 in greater detail.

The sync separator 71 is obviously of a conventional type. The color lock 76 has a potentiometer 132 which provides the lead 130 with the above mentioned adjustable DC bias and which is internally adjustable at the factory or during service.

The phase comparator 53, low pass filter 56 and buffer 57 are also of conventional design and the application thereto of the signal provided by the discriminator 99 is apparent from the showing of these parts of FIG. 4.

A combination according to a preferred embodiment of the subject invention is shown in FIG. 6, with reference to the other figures.

More specifically, FIG. 2 shows at 12 an information carrier or medium having physical characteristics, such as a magnetic or other information recording representative of synchronized color video information, such as shown in FIG. 1.

An electric power supply 141 provides alternating-current power having variable frequency characterisitics. For instance, the supply 141 may comprise an electric power generator which provides power at a frequency that is only moderately stable.

Transport equipment 13, such as a video tape recording or playback machine, is coupled to the supply 141 via a power line 142, for transporting the medium 12 at a variable relative speed dependent upon the variable frequency or frequency fluctuations of the alternating-current power provided by the source 141.

By way of example, the information carrier or medium may comprise a magnetic recording tape which issues out of a tape cassette 143 to be driven by a tape capstan drive 144. The illustrated transport 13 also has a head or tape drum 145 for guiding or advancing the tape 12 relative to one or more magnetic or other playback heads 17 (compare FIG. 2 and its disclosure set forth above). The tape 12 may be wound inside the cassette 143 by a tape winding motor 147 or other conventional device.

The playback head or heads 17 may be located on a conventional head disc (not shown) situated in the drum 145 and rotated by a head drive 148. The playback head or heads 17 constitute transducer means disposed in proximity to the information medium or tape 12 and responsive to the physical characteristics of, or video recording on, the information medium to provide an electric signal 10 (see FIGS. 1 and 2) including a synchronization component and including a chrominance component 15 having a time base error dependent upon the variable speed of the transport means 13 or 144 and/or 148.

The equipment 149 shown in FIG. 6 includes the apparatus shown in FIGS. 2 and 4 and thus constitutes means responsive to the synchronization component, notably the horizontal sync signal, of the played-back electrical signal for compensating the time base error of the chrominance component 15 of the electrical signal.

The equipment 149 shown in FIG. 6 also includes conventional circuitry for driving a color video display tube 151 of a color video monitor or display apparatus.

In accordance with the illustrated preferred embodiment of the invention, the power supply 141, as well as the playback machine 13 and video display apparatus, are mounted for portable movement by a vehicle 153, such as an aircraft, railroad train, bus or boat, where the displayed video program may serve the entertainment of passengers. If desired, the combination according to the invention may also be used in stationary installation; especially those where the power is generated locally or is otherwise subject to frequency variations.

While specific embodiments have been disclosed herein, various modifications and variations within the spirit and scope of the invention will suggest themselves or become apparent to those skilled in the art from the subject disclosure.

We claim:

1. In combination: an information medium having physical characteristics representative of synchronized color video information:
   an electric power supply providing alternating-current power subject to frequency fluctuations;
   transport means coupled to the power supply for transporting the information medium at a variable relative speed dependent upon the freqency fluctuations of the alternating-current power;

tranducer means disposed in proximity to the information medium and responsive to the physical characteristics of the information medium to provide an electrical signal including a synchronization component and including a chrominance component having color sidebands on a first carrier frequency and a time-base error dependent upon the variable speed of the transport means, said synchronization component including a horizontal synchronization signal affected by said time-base error;

means connected to said transducer means for amplifying said electric signal including said synchronization component and said chrominance component having said color sidebands;

means for compensating the time-base error of the chrominance component of the electric signal including color lock means for providing a direct current signal, automatic phase control means connected to said color lock means and to said amplifying means to provide with the aid of said direct current signal and said amplified electric signal an output signal having a frequency different from said first carrier frequency and being affected by said time-base error, and means connected to said amplifying means and to said automatic phase control means for relocating the amplified color sidebands about a stable second carrier frequency with the aid of said output signal of said automatic phase control means; and means for augmenting the tolerance of said color lock means to effects of said frequency fluctuations including means for sensing a pulse rate change in said horizontal synchronization signal, means connected to said sensing means for providing a rate change signal corresponding to the sensed rate change, and means for augmenting said direct current signal with said rate change signal.

2. The combination recited in claim 1, wherein the power supply is mounted for portable movement by a vehicle.

3. The combination recited in claim 2, wherein the vehicle is an aircraft.

4. The combination recited in claim 2, wherein the vehicle is a train.

5. The combination recited in claim 1, wherein:
the information is a magnetic tape; and
the transport means and the transducer means are included in color video tape playback equipment.

* * * * *